July 19, 1960

D. P. MARQUIS ET AL 2,945,364

UNIVERSAL JOINT

Filed Dec. 29, 1958

INVENTORS
Donald P. Marquis, &
BY Raymond J. Schultz

L.D. Burch
ATTORNEY

July 19, 1960 D. P. MARQUIS ET AL 2,945,364
UNIVERSAL JOINT
Filed Dec. 29, 1958 2 Sheets-Sheet 2
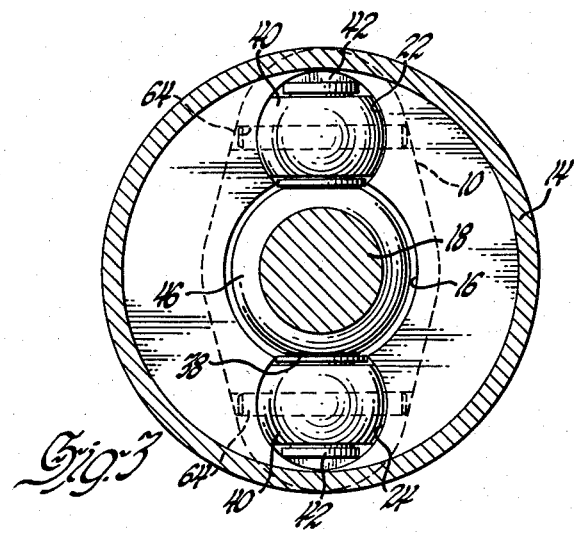
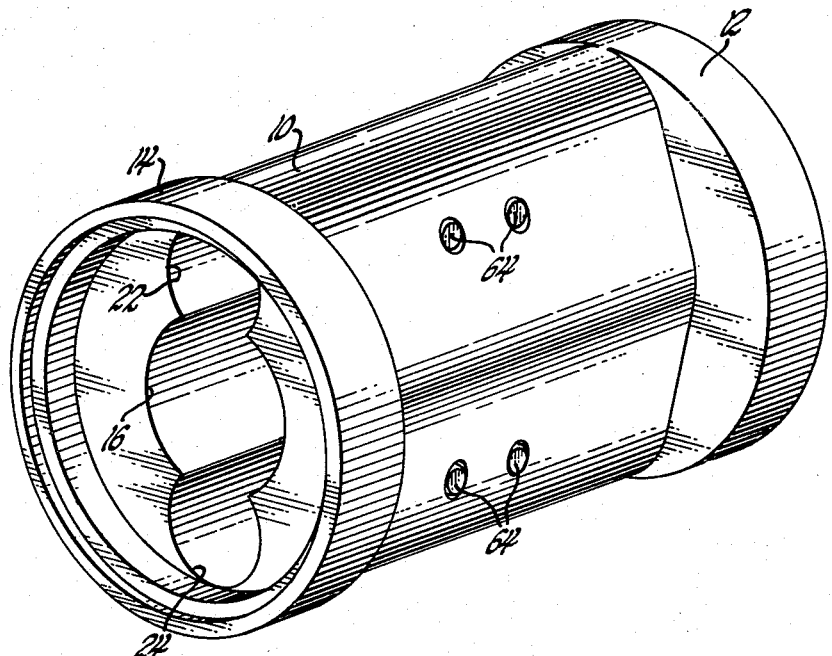
INVENTORS
Donald P. Marquis &
BY Raymond J. Schultz
ATTORNEY

United States Patent Office 2,945,364
Patented July 19, 1960

2,945,364

UNIVERSAL JOINT

Donald P. Marquis, Saginaw, and Raymond J. Schultz, Bay City, Mich., assignors to General Motors Corporation, Detroit, Mich., a corporation of Delaware Filed Dec. 29, 1958, Ser. No. 783,312

3 Claims. (Cl. 64—8)

This invention relates to universal joints and more particularly to the type of universal joint having a housing with a plurality of axial openings therethrough to receive the input and output shafts and the trunnion and bearing assemblies.

Universal joints of the general type employing a housing having shaft receiving openings and bearing receiving openings axially disposed therethrough, have become well known in the automotive industry and are adapted to a wide variety of applications. Constant automobile design changes require corresponding changes in the component parts, from the standpoint of ease and economy in manufacture and improved vehicle engineering. Improved manufacturing methods have made the generally available universal joint too expensive for production usage, particularly due to the shape of the universal joint housing and the methods required to manufacture the housing.

In universal joints of the type described, the housing has been formed from a casting or forging and blind boring operations have been required to provide the necessary openings. In using a double universal joint of this type, assembly has been extremely difficult and expensive according to modern production procedures. Limiting axial slip of the input and output shafts has been a constant problem, as has been the amount of wear in the input and output shaft connecting assembly because of the wear taking place in most available joints. Manufacturers have been required to spend great sums of money in the production and maintenance of replacement parts, and the vehicle user is deprived of the use of his automobile during those periods when replacements are necessary.

The device in which this invention is embodied eliminates many of the difficulties found in generally available universal joints. The joint comprises, generally, a housing open at both ends for ease in manufacture, a wear takeup assembly in the connecting portions of the input and output shafts and a means for limiting the axial slip of the shafts without disturbing the workability of the joint. Economy of manufacture and ease in vehicle design through improved universal joints are made possible by the universal joint embodying this invention, and great savings in time, labor and manufacturing costs are realized. Replacement parts are virtually eliminated and the vehicle user is not deprived of the use of his vehicle because of non-extraordinary part failure.

These and other features will become more apparent from the following description and drawings in which:

Figure 3 is a cross sectional view of the universal joint of Figure 1 taken substantially along the line 3—3 and looking in the direction of the arrows.

Figure 4 is an isometric view of the universal joint housing illustrating the position of the axial movement limiting means.

Figure 1:
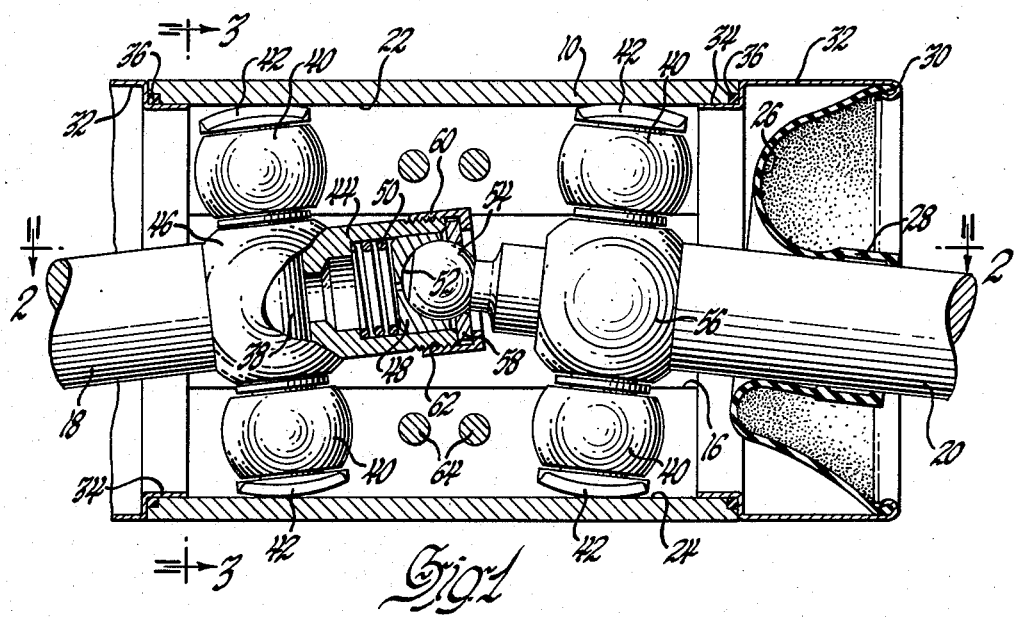
Figure 1 is an elevational view of the universal joint with parts broken away and in section to illustrate the location of the various parts.
Figure 2:
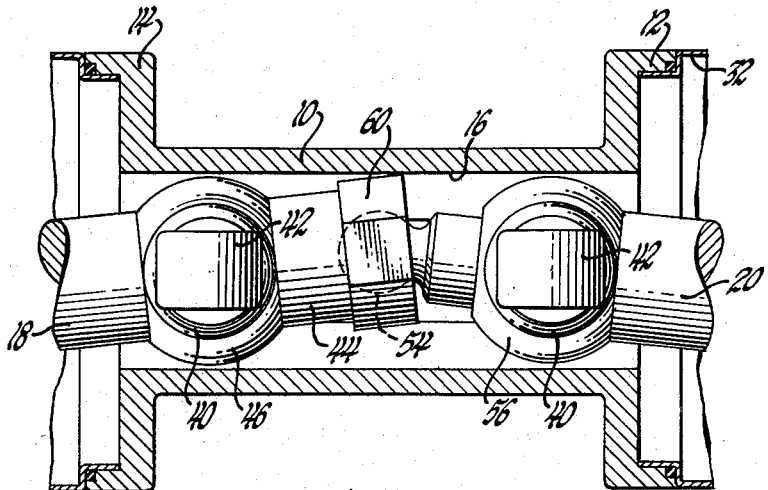
Figure 2 is a cross sectional view of the universal joint of Figure 1 taken substantially along the line 2—2 and looking in the direction of the arrows.

Referring more particularly to the drawings, a universal joint is shown having a housing 10, the housing having flanges 12 and 14 formed on either end thereof. A shaft receiving opening 16 is centrally formed through the housing to receive the input and output shafts 18 and 20. A pair of spaced bearing receiving openings 22 and 24 are axially formed through the housing and communicate with the shaft receiving opening 16. It may be seen that in manufacturing the housing, a single broaching operation is sufficient to form the shaft receiving opening and the bearing receiving openings from the rough castings, eliminating the blind boring operations required.

An oil and dirt seal 26 is provided at either end of the housing 10, only one of which is shown. The seal has a cylindrical portion 28 received about the shaft 20 to prevent the passage of oil or dirt along the shaft. The seal terminates in an annular rib 30 which is received in the retaining sleeve 32. The retaining sleeve may be rolled about the annular rib 30, or secured in any other suitable manner. The sleeve has a portion of decreased diameter 34 which is received in the flange 14 of the housing 10. An O-ring 36 prevents the passage of oil or dirt between the retainer 32 and the housing 10.

A trunnion shaft 38 is secured in the inner end of each of the input and output shafts 18 and 20 and extends into the bearing receiving openings 22 and 24. As in the usual construction, an annulus of needle bearings is disposed about each end of the trunnion shaft and a bearing sleeve 40 disposed about the needle bearings. A bearing cap 42 is received in the end of the trunnion shaft in the usual manner and bears against the outer wall of the bearing receiving opening 22 or 24. The bearing sleeve 40 is allowed relatively frictionless rotation about the trunnion shaft 38 when axial movement occurs between trunnion and bearing assembly and the universal joint housing 10.

The shaft 18 is provided with a tubular extension 44 which extends from the enlarged portion 46 toward the shaft 20. A socket block 48 is slidably received in the tubular extension 44 and is biased in an outward direction by a spring 50. The socket block 48 has a spherical cavity 52 formed therein to receive the ball member 54 extending from the enlarged portion 56 of shaft 20, the spherical surface of the ball member cooperating with the cavity in the socket block 48. The ball member 54 is prevented from disengaging the socket block 48, in a direction to the right as viewed in Figure 1, by a split washer 58 having an inside diameter less than the maximum diameter of the ball member 54. A hollow nut 60, engaging the threads 62, formed in the tubular extension 44, retains the washer 58 in contact with the ball member 54 and prevents the separation of the ball member from the socket block 48. The socket block and ball member provide pivotal movement of the shafts 18 and 20 with respect to each other for proper driving torque transmission and for ease in balancing the vehicle drive line. Should any wear occur in either the ball member or the socket block due to constant relative motion therebetween, the spring 50 biases the socket block toward the ball member 54 to compensate for any such wear.

In order to limit the axial movement of the shafts 18 and 20 and the trunnion and bearing assembly secured therein, a plurality of pins 64 are disposed transversely through the housing and through the bearing receiving openings 22 and 24. It may be seen that excessive axial movement of either shaft member will cause the bearing caps 40 to engage the pins 64 and prevent any further axial movement.

Thus, it may be seen that a double universal joint of the type having a housing with shaft and bearing receiving openings is provided, that admits of relatively inexpensive manufacturing processes and is adaptable to modern production procedures.

The claims:

1. A universal joint comprising a housing having an axial shaft receiving bore therethrough and spaced bearing receiving openings therethrough on either side of said shaft receiving bore, first and second shafts extending into said bore, a trunnion and bearing and bearing cap assembly secured in the end of each of said shafts and within said housing, a plurality of thrust buttons secured in said assemblies and bearing against the surfaces of said bearing receiving openings, said first shaft terminating within said housing in a tubular extension, a block slidably disposed in said tubular extension and having a spherical cavity formed therein, resilient means in said tubular extension and abutting said block to bias said block in an outward direction, said second shaft terminating within said housing in a ball portion receivable in said tubular extension and in said spherical cavity in said block, means retaining said ball portion in said tubular extension and in said cavity, said resilient means maintaining said block in engagement with said ball portion to properly space said first and second shafts with respect to each other within said housing and to compensate for wear between said ball portion and said block, and stop pins extending transversely through said bearing receiving openings to limit the axial movement of said shafts and said assemblies with respect to said housing during operation of said universal joint.

2. In a universal joint having a housing and a pair of shafts extending into said housing and a pair of trunnion and bearing assemblies on said shafts and axially and slidably received in said housing, said shafts being connected between said assemblies by a ball and socket joint, a plurality of pins extending transversely of said housing and between said trunnion and bearing assemblies to limit the axial movement of said assemblies in either direction with respect to said housing.

3. In a universal joint having a housing and first and second shafts extending into said housing, a trunnion and bearing assembly secured to each of said shafts and within said housing, said assemblies being movable in an axial direction in said housing, a resiliently biased ball and socket joint connecting said shafts between said assemblies, and a plurality of pins extending transversely through said housing and between said trunnion and bearing assemblies to limit the axial movement of said assemblies and said shafts within said housing.

References Cited in the file of this patent

UNITED STATES PATENTS

| | | |
|---|---|---|
| 2,087,364 | Trbojevich | July 20, 1937 |
| 2,186,846 | Trbojevich | Jan. 9, 1940 |
| 2,208,314 | Snyder | July 16, 1940 |
| 2,329,903 | Horne | Sept. 21, 1943 |
| 2,681,552 | Olson | June 22, 1954 |
| 2,712,741 | Roller | July 12, 1955 |
| 2,755,641 | Dunn | July 24, 1956 |